(12) United States Patent
Ouchi et al.

(10) Patent No.: US 12,276,341 B2
(45) Date of Patent: Apr. 15, 2025

(54) VALVE DEVICE AND HOT WATER SUPPLY DEVICE

(71) Applicant: NORITZ CORPORATION, Hyogo (JP)

(72) Inventors: Ryoji Ouchi, Hyogo (JP); Kenichi Nakayama, Hyogo (JP); Masahiro Mori, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 75 days.

(21) Appl. No.: 18/482,019

(22) Filed: Oct. 6, 2023

(65) Prior Publication Data

US 2024/0142006 A1 May 2, 2024

(30) Foreign Application Priority Data

Oct. 31, 2022 (JP) ................. 2022-174703

(51) Int. Cl.
*F16K 11/07* (2006.01)
*F16K 11/076* (2006.01)
*F24D 19/10* (2006.01)

(52) U.S. Cl.
CPC ........ *F16K 11/076* (2013.01); *F24D 19/1024* (2013.01); *F24D 2220/0242* (2013.01)

(58) Field of Classification Search
CPC .................................................. F24D 19/1024
See application file for complete search history.

(56) References Cited

U.S. PATENT DOCUMENTS

| 2003/0116196 | A1* | 6/2003 | Sasao ...................... G05D 7/03 |
| | | | 137/501 |
| 2007/0214814 | A1* | 9/2007 | Umemura ........... F04B 27/1804 |
| | | | 62/228.1 |
| 2015/0027572 | A1* | 1/2015 | Morein ................. F16K 41/026 |
| | | | 137/594 |
| 2017/0219104 | A1* | 8/2017 | Lin ..................... F16K 11/0853 |
| 2018/0172216 | A1* | 6/2018 | Jenks ........................ F17D 3/00 |
| 2018/0328501 | A1* | 11/2018 | Hiraoka ................ F16K 11/085 |
| 2018/0372232 | A1* | 12/2018 | Konaka ................. F16K 11/076 |
| 2019/0032960 | A1* | 1/2019 | Tsuda ....................... F24H 9/139 |
| 2019/0128434 | A1* | 5/2019 | Van Leyen ......... F16K 11/0743 |
| 2019/0368621 | A1* | 12/2019 | Marchand ............. F16K 11/085 |

(Continued)

FOREIGN PATENT DOCUMENTS

JP 5004674 8/2012

*Primary Examiner* — Kevin R Barss
(74) *Attorney, Agent, or Firm* — JCIPRNET

(57) ABSTRACT

A valve device includes: a case having a valve chamber and first to third water communication ports communicating with the valve chamber; first and second valve bodies disposed in the valve chamber; and a shaft body connected with the first valve body. The first valve body is rotated about a central axis of the shaft part. The second valve body is rotated about the central axis together with the first valve body. When rotated about the central axis in a first angle region, the first valve body changes a first flow rate, i.e., a flow rate of water between the first and third water communication ports, and a second flow rate, i.e., a flow rate of water between the second and third water communication ports. When the first valve body is rotated about the central axis in a second angle region, the second valve body changes the second flow rate.

6 Claims, 18 Drawing Sheets

(56) References Cited

U.S. PATENT DOCUMENTS

| | | | |
|---|---|---|---|
| 2020/0173565 A1* | 6/2020 | Kusumoto | F16K 5/188 |
| 2020/0326015 A1* | 10/2020 | Hasel | F16K 31/566 |
| 2020/0386331 A1* | 12/2020 | Chapman | F16K 5/0478 |
| 2021/0080017 A1* | 3/2021 | Long | E03D 9/00 |
| 2021/0246990 A1* | 8/2021 | Maruyama | F16K 11/076 |
| 2021/0254740 A1* | 8/2021 | Li | F01P 7/14 |

* cited by examiner

VALVE DEVICE AND HOT WATER SUPPLY DEVICE

CROSS-REFERENCE TO RELATED APPLICATION

This application claims the priority benefit of Japan application serial No. 2022-174703, filed on Oct. 31, 2022. The entirety of the above-mentioned patent application is hereby incorporated by reference herein and made a part of this specification.

BACKGROUND

Technical Field

The invention relates to a valve device and a hot water supply device.

Description of Related Art

For example, Japanese Patent No. 5004674 (Patent Document 1) discloses a mixing valve. The mixing valve disclosed in Patent Document 1 includes a case, a valve body, and a shaft part. The case is provided with a valve chamber, a water inlet in communication with the valve chamber, a hot water inlet, and an outlet. The valve body is disposed in the valve chamber. The valve body is in a tubular shape extending along the direction of the central axis of the shaft part. In the direction of the central axis of the shaft part, the valve body has a first end and a second end on a side opposite to the first end. The first end of the valve body is blocked, and the second end of the valve body is not blocked. The shaft part is connected with the first end of the valve body. The valve body is rotated about the central axis of the shaft part. An opening part is formed in the valve body.

When the valve body is rotated about the central axis of the shaft part in a first angle region, as the valve body approaches the second angle region, the opening area of the opening part of the valve body when viewed from the water inlet decreases. When the valve body is rotated about the central axis of the shaft part in the first angle region, the opening area of the opening part of the valve body when viewed from the hot water inlet increases. Therefore, in the mixing valve of Patent Document 1, by rotating the valve body about the central axis of the shaft part in the first angle region, the ratio of the flow rate of water (hot water) flowing from the hot water inlet to the outlet to the flow rate of water flowing from the water inlet to the outlet is adjusted.

When the valve body is rotated about the central axis of the shaft part in the second angle region, the opening area of the opening part of the valve body when viewed from the water inlet is maintained at the minimum (maintained at 0). When the valve body is rotated about the central axis of the shaft part in the second angle region, as the valve body moves away from the first angle region, the opening area of the opening part of the valve body when viewed from the water inlet decreases. Therefore, in the mixing valve of Patent Document 1, by rotating the valve body about the central axis of the shaft part in the second angle region, the flow rate of water (hot water) flowing from the hot water inlet to the outlet is adjusted.

PRIOR ART DOCUMENT(S)

Patent Document(s)

[Patent Document 1] Japanese Patent No. 5004674

The mixing valve of Patent Document 1 is used in a hot water supply device, for example. In the hot water supply device having the mixing valve of Patent Document 1, a first pipe is connected to the water inlet, a second pipe is connected to the hot water inlet, and a third pipe is connected to the outlet. The water inlet is connected with a tap water pipe via the first pipe. The hot water inlet is connected with a heat exchanger via the second pipe. The hot water supply device having the mixing valve of Patent Document 1 supplies hot water via the third pipe.

In the hot water supply device having the mixing valve of Patent Document 1, by rotating the valve body about the central axis of the valve part in the first angle region, the temperature of the supplied hot water is adjusted. Even if the valve body is rotated to the maximum about the central axis of the shaft part in the first angle region, due to the upper limit of the heating capability of the heat exchanger, the temperature of the hot water may be insufficient. In such case, by rotating the valve body about the central axis of the shaft part in the second angle region, the flow rate of the water (hot water) from the hot water inlet to the outlet is adjusted, and the temperature of the supplied hot water increases.

However, in the hot water supply device using the mixing valve of Patent Document 1, when the valve body is rotated about the central axis of the shaft part in the second angle region, the flow rate of the water (hot water) flowing from the hot water inlet to the outlet varies significantly at each rotational angle, and it is difficult to adjust the temperature of the supplied hot water. The invention provides a valve device and a hot water supply device with which the temperature of the supplied hot water is adjusted easily.

SUMMARY

A valve device according to the invention includes a case, a first valve body and a second valve body, and a shaft body connected with the first valve body. The case has a valve chamber, a first water communication port, a second water communication port, and a third water communication port are in communication with the valve chamber. The first valve body and the second valve body are disposed in the valve chamber. The first valve body is rotated about a central axis of the shaft part. The second valve body is rotated about the central axis together with the first valve body. When the first valve body is rotated about the central axis in a first angle region, a first flow rate and a second flow rate are changed by the first valve body, wherein the first flow rate is a flow rate of water flowing between the first water communication port and the third water communication port, and the second flow rate is a flow rate of water flowing between the second water communication port and the third water communication port. When the first valve body is rotated about the central axis in a second angle region, the second flow rate is changed by the second valve body.

In the valve device, it may also be that the first flow rate decreases as the first valve body approaches the second angle region when the first valve body is rotated about the central axis in the first angle region, and the first flow rate is maintained at a minimum when the first valve body is rotated in the second angle region, and the second flow rate increases as the first valve body approaches the second angle region when the first valve body is rotated about the central axis in the first angle region, and the second flow rate decreases as the first valve body moves away from the first angle region when the first valve body is rotated about the central axis in the second angle region.

In the valve device, it may also be that a ratio of the first flow rate with respect to a sum of the first flow rate and the second flow rate decreases linearly as the first valve body approaches the second angle region when the first valve body is rotated about the central axis in the first angle region.

In the valve device, it may also be that the first valve body is in a tubular shape extending along a direction of the central axis, in the direction of the central axis, the first valve body has a first end and a second end on a side opposite to the first end, an internal space of the first valve body is blocked at the first end and is partially blocked at the second end by the second valve body, in the first valve body, a first opening part and a second opening part in communication with the internal space of the first valve body are formed, in the second valve body, a third opening part in communication with the internal space of the first valve body is formed, a first opening area, as an opening area of the first opening part when viewed from the first water communication port, decreases as the first valve body approaches the second angle region when the first valve body is rotated about the central axis in the first angle region, and is maintained at a minimum when the first valve body is rotated about the central axis in the first angle region, and a second opening area, as an opening area of the second opening part when viewed from the second water communication port, increases as the first valve body approaches the second angle region when the first valve body is rotated about the central axis in the first angle region, and is maintained at a maximum when the first valve body is rotated about the central axis in the second angle region, and a third opening area, as an opening area of the third opening part when viewed from the third water communication port, is maintained at a maximum vale when the first valve body is rotated about the central axis in the first angle region, and decreases as the first valve body moves away from the first angle region when the first valve body is rotated about the central axis in the second angle region.

In the valve device, it may also be that the second valve body is engaged with the second end to be not rotatable about the central axis.

A hot water supply device includes a first pipe, a second pipe, and a third pipe, a heat exchanger, and the valve device. The first water communication port is connected with a tap water pipe by using the first pipe. The second water communication port is connected with the heat exchanger by using the second pipe. The third water communication port is connected with the third pipe. Hot water is supplied via the third pipe.

DESCRIPTION OF THE EMBODIMENTS

According to the valve device and the hot water supply device of the invention, it is easy to adjust the temperature of the supplied hot water.

Details of the embodiments are described with reference to the drawings. In the following drawings, like or equivalent components are labeled with like reference symbols, and the same description will not be made repetitively. A valve device according to the embodiment is set as a valve device 100, and a hot water supply device according to the embodiment is set as a hot water supply device 200.
(Configuration of the Valve Device 100)

In the following, the configuration of the valve device 100 is described.

Figure 1A:
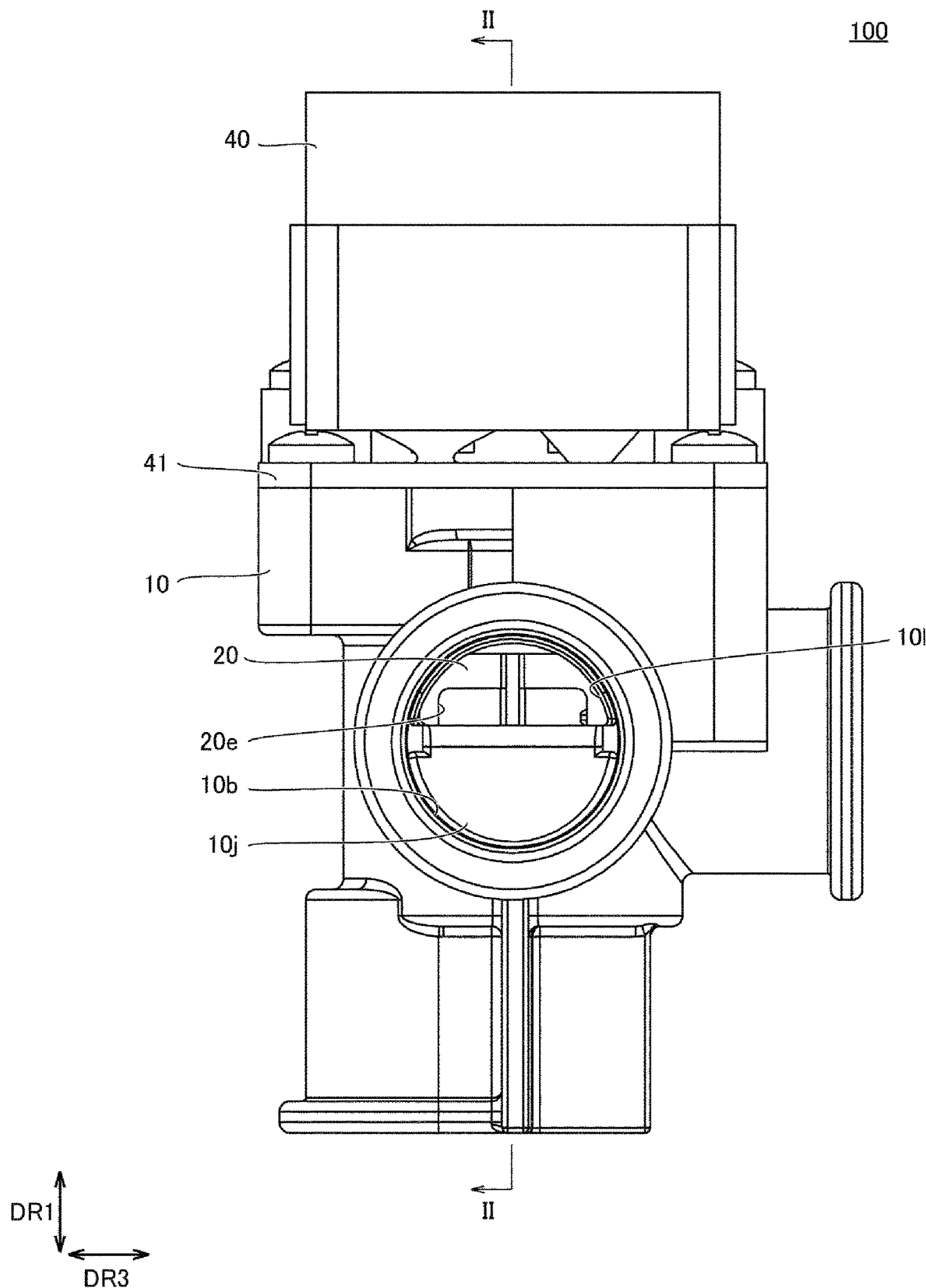
FIG. 1A is a first side view of a valve device 100.
Figure 1B:
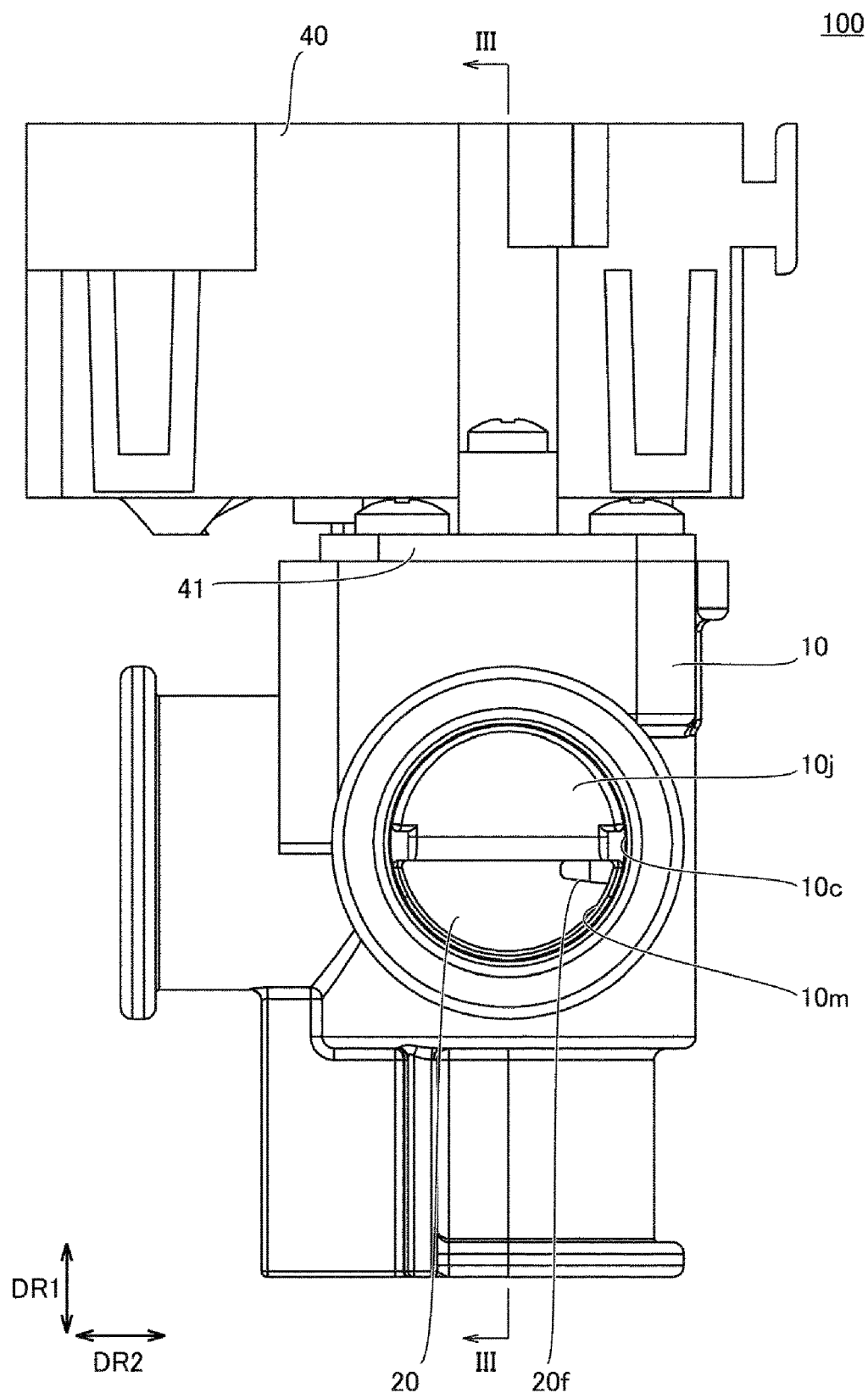
FIG. 1B is a second side view of the valve device 100.
Figure 2:
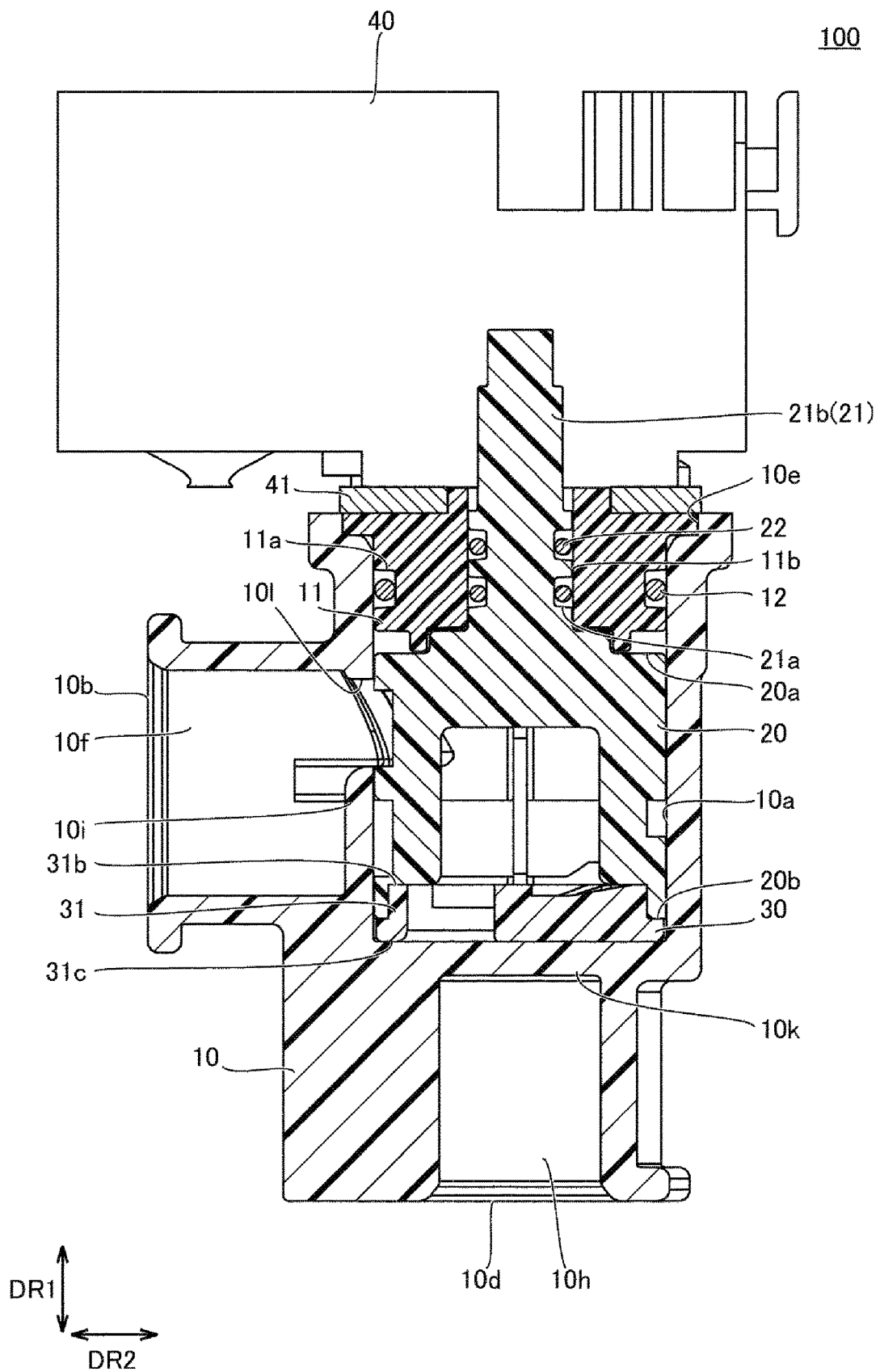
FIG. 2 is a cross-sectional view taken along II-II in FIG. 1A.
Figure 3:
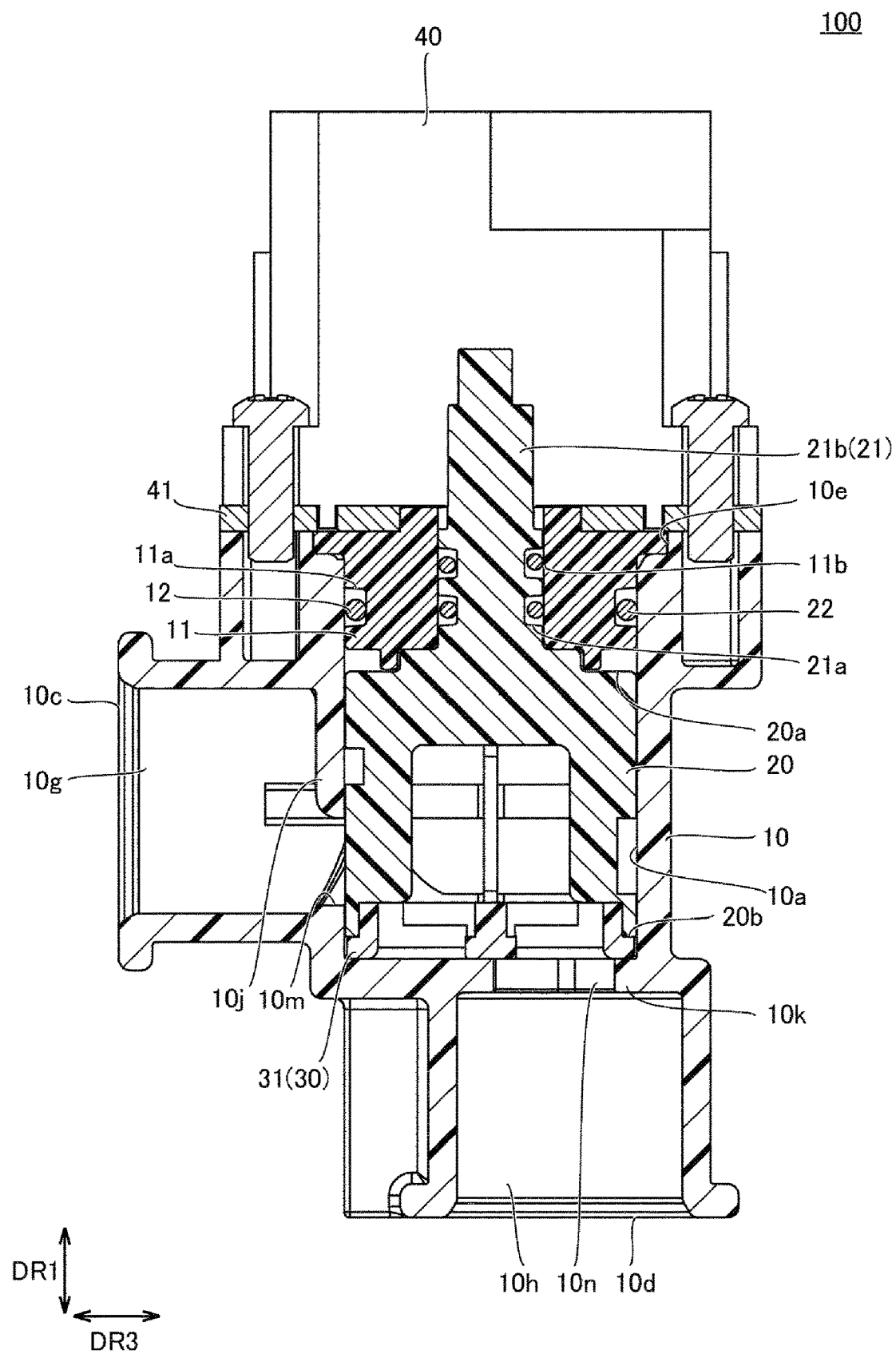
FIG. 3 is a cross-sectional view taken along III-III in FIG. 1B.
Figure 4A:
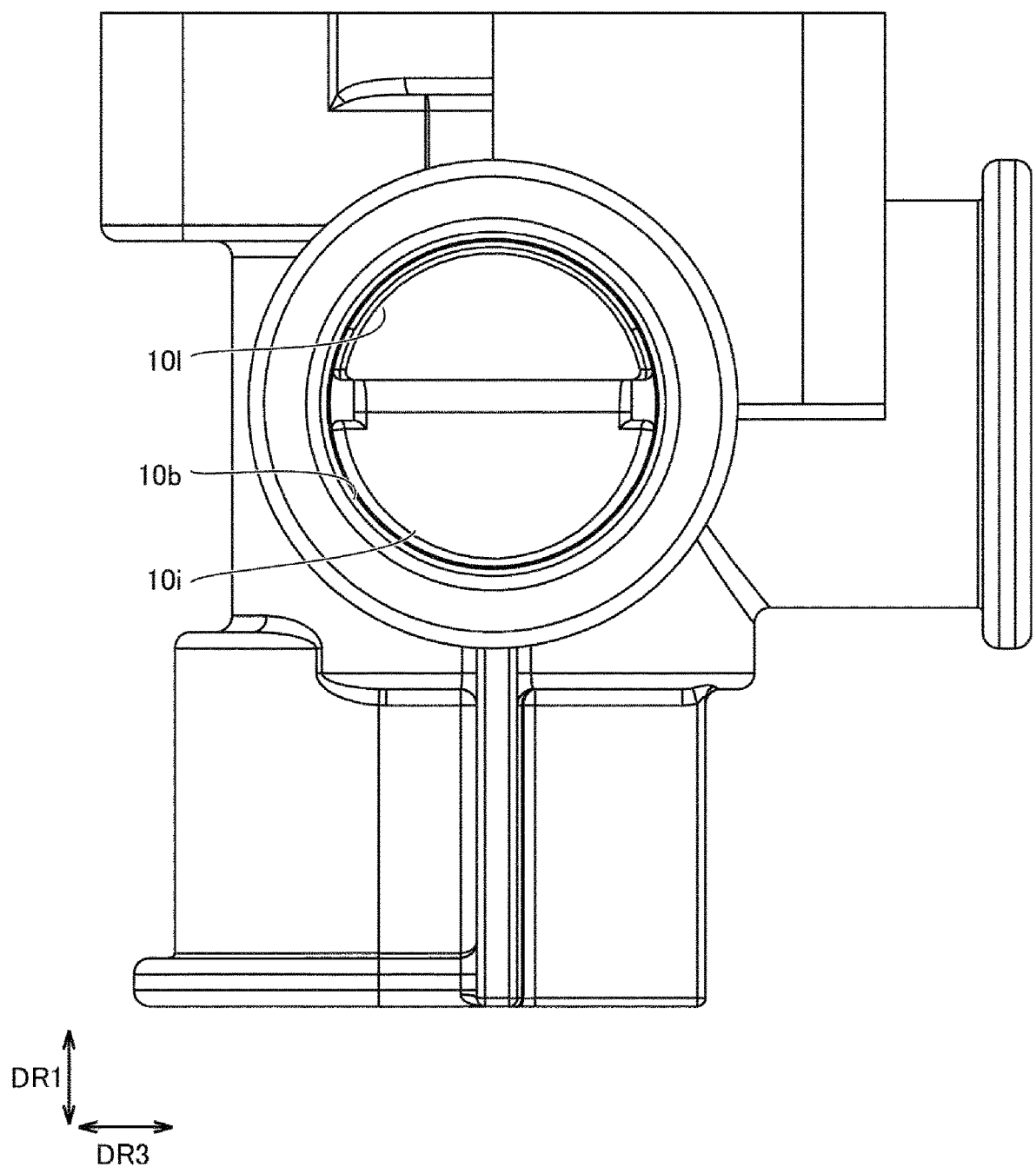
FIG. 4A is a first side view of a case 10.
Figure 4B:
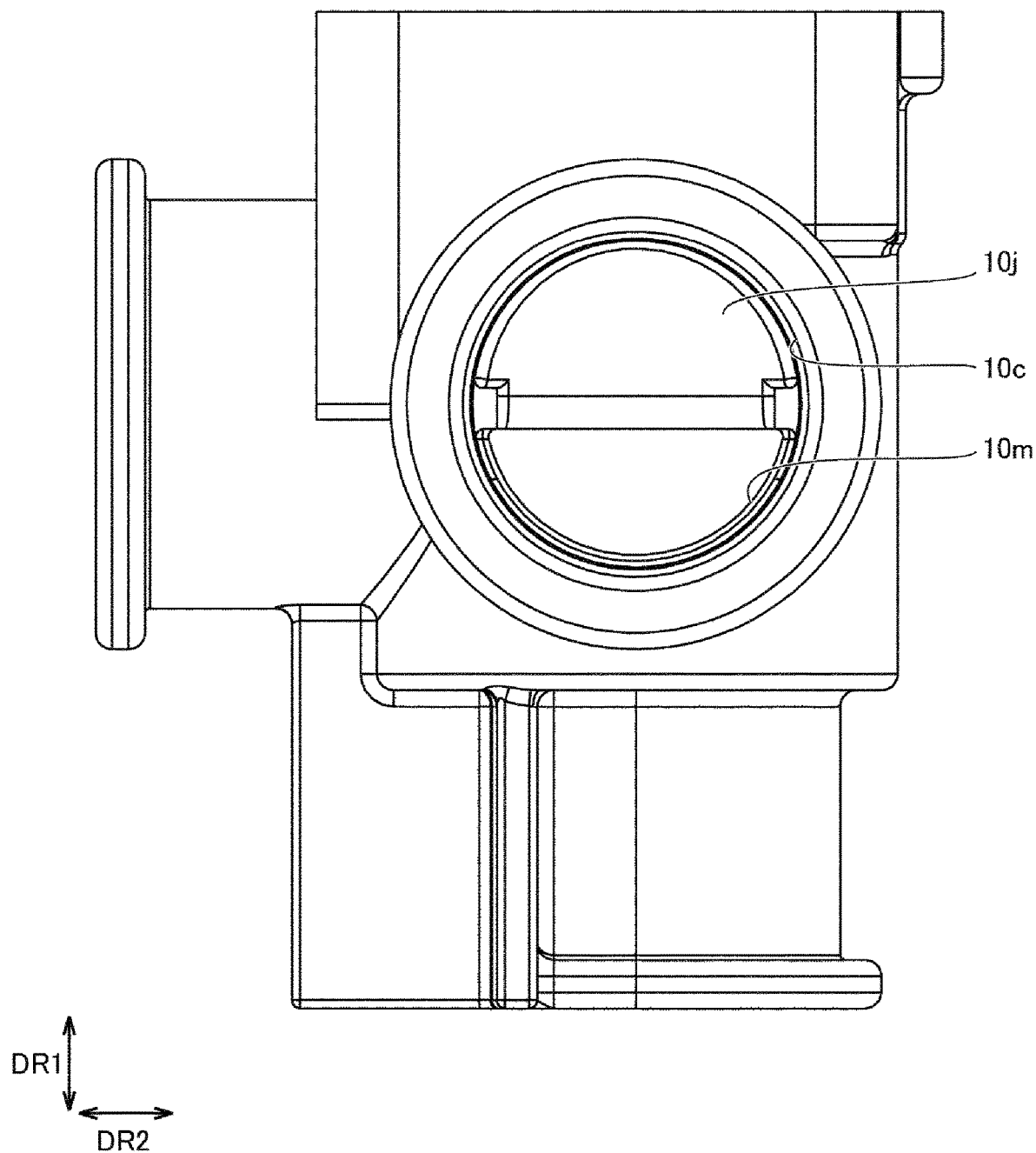
FIG. 4B is a second side view of the case 10.
Figure 4C:
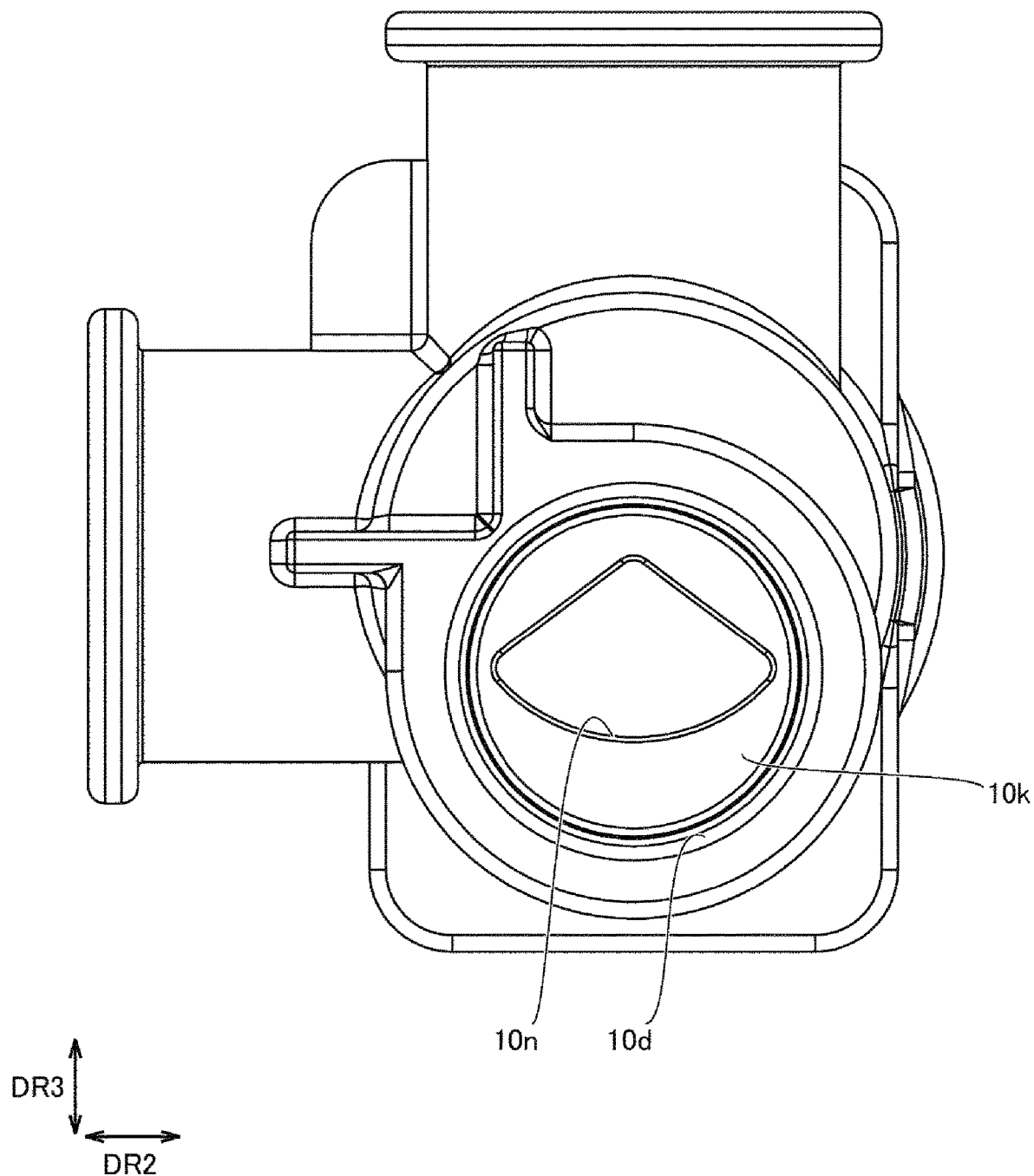
FIG. 4C is a bottom view of the case 10.
Figure 5A:
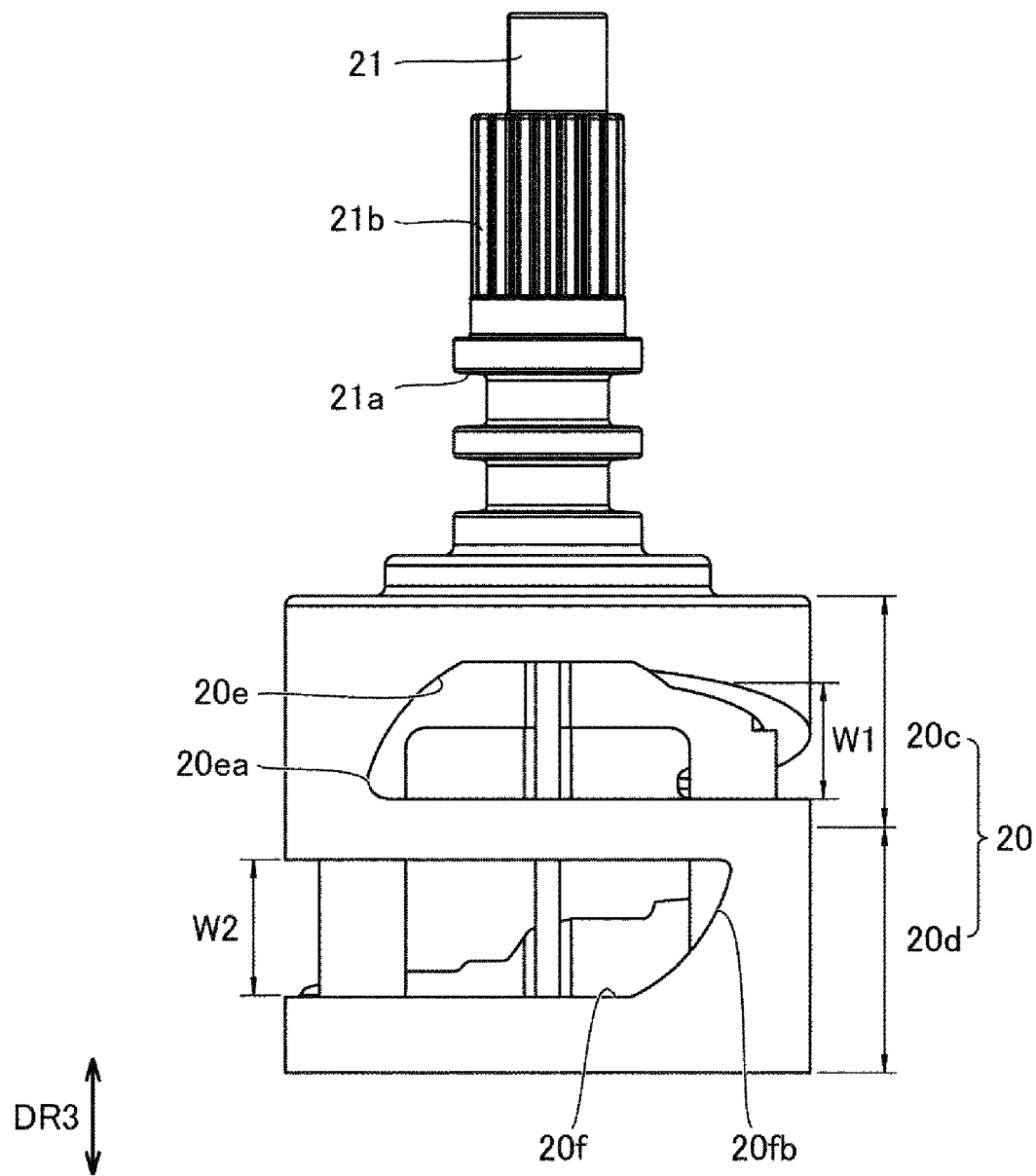
FIG. 5A is a first side view of a first valve body 20.
Figure 5B:
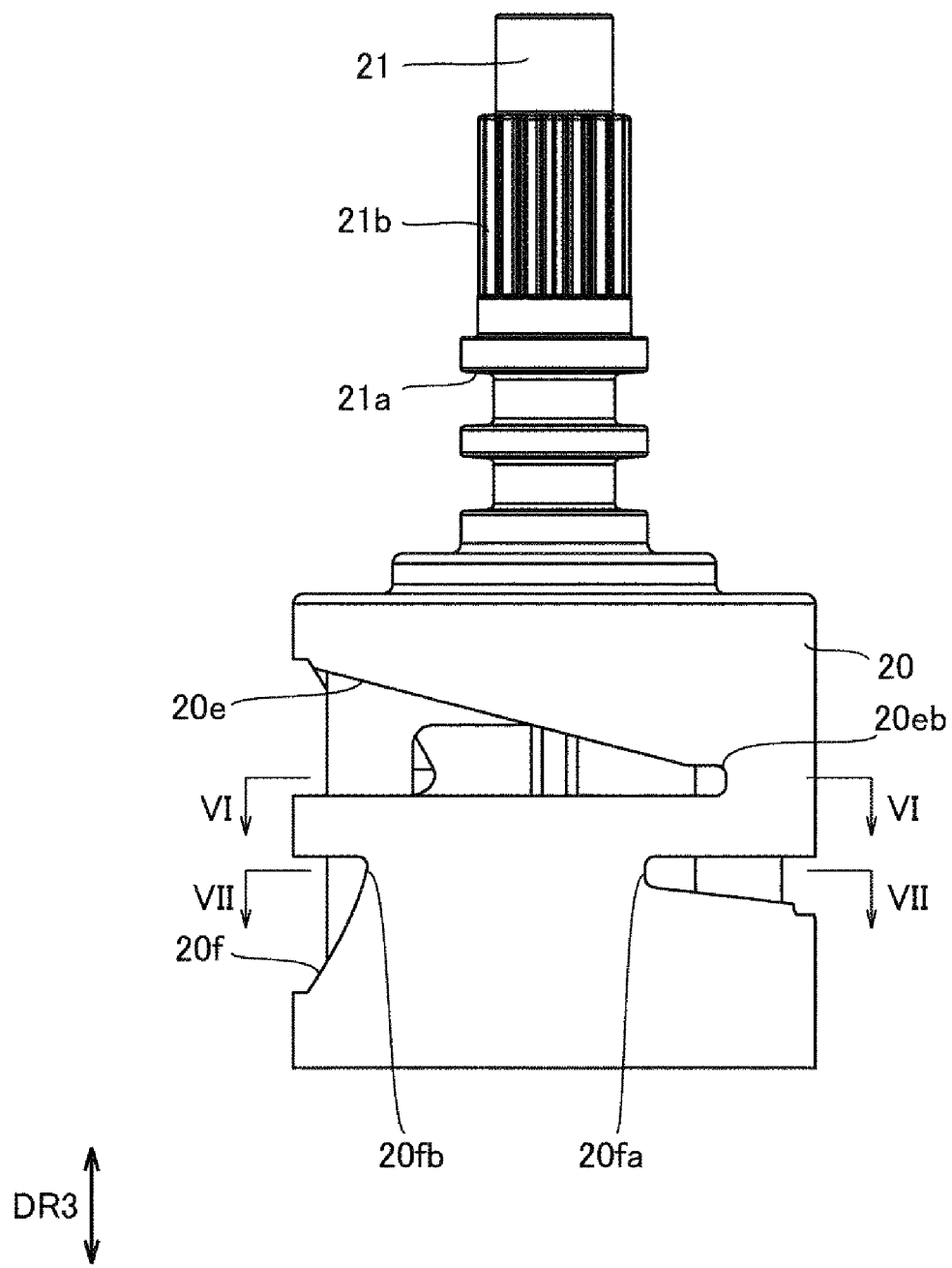
FIG. 5B is a second side view of the first valve body 20.
Figure 5C:
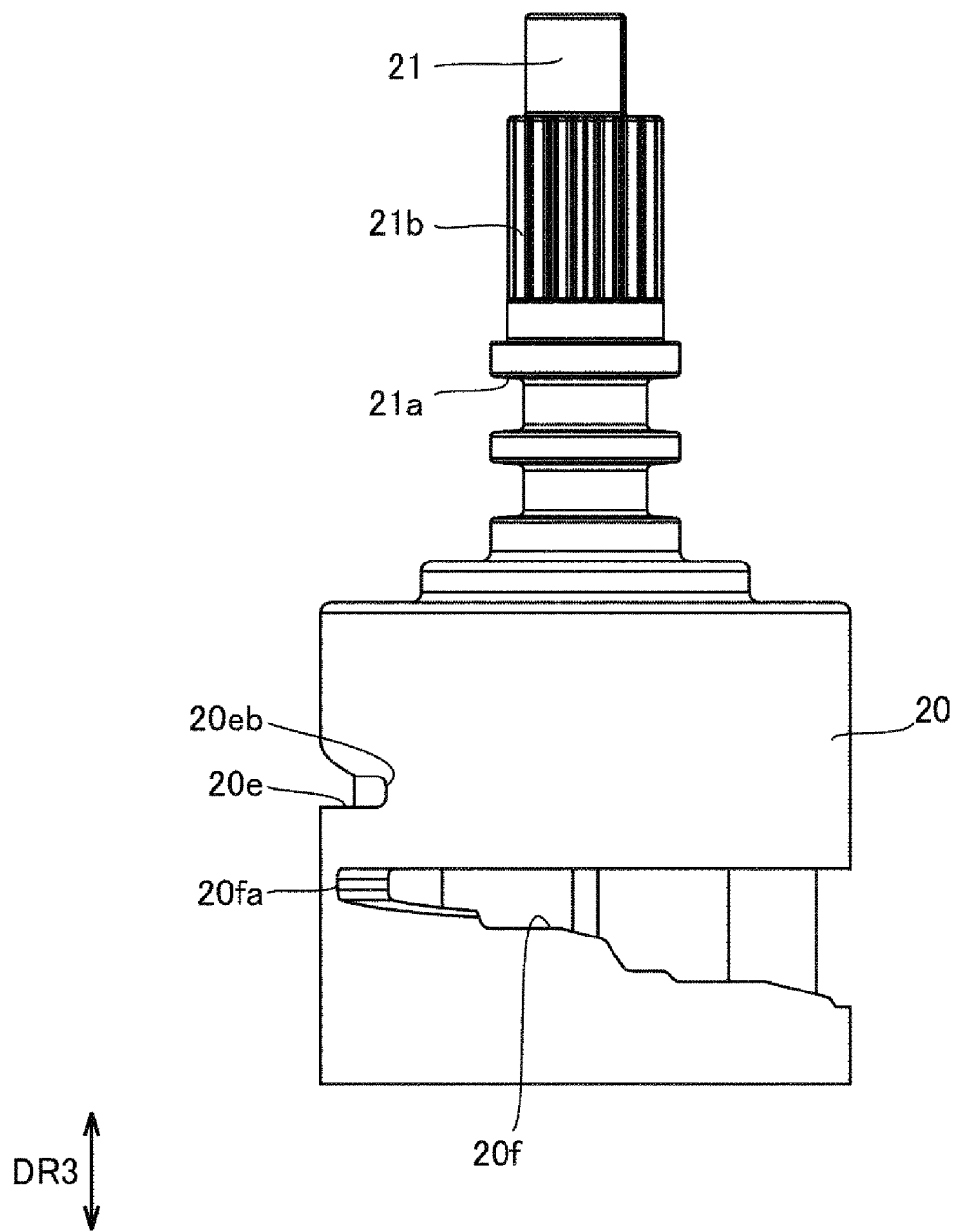
FIG. 5C is a third side view of the first valve body 20.
Figure 5D:
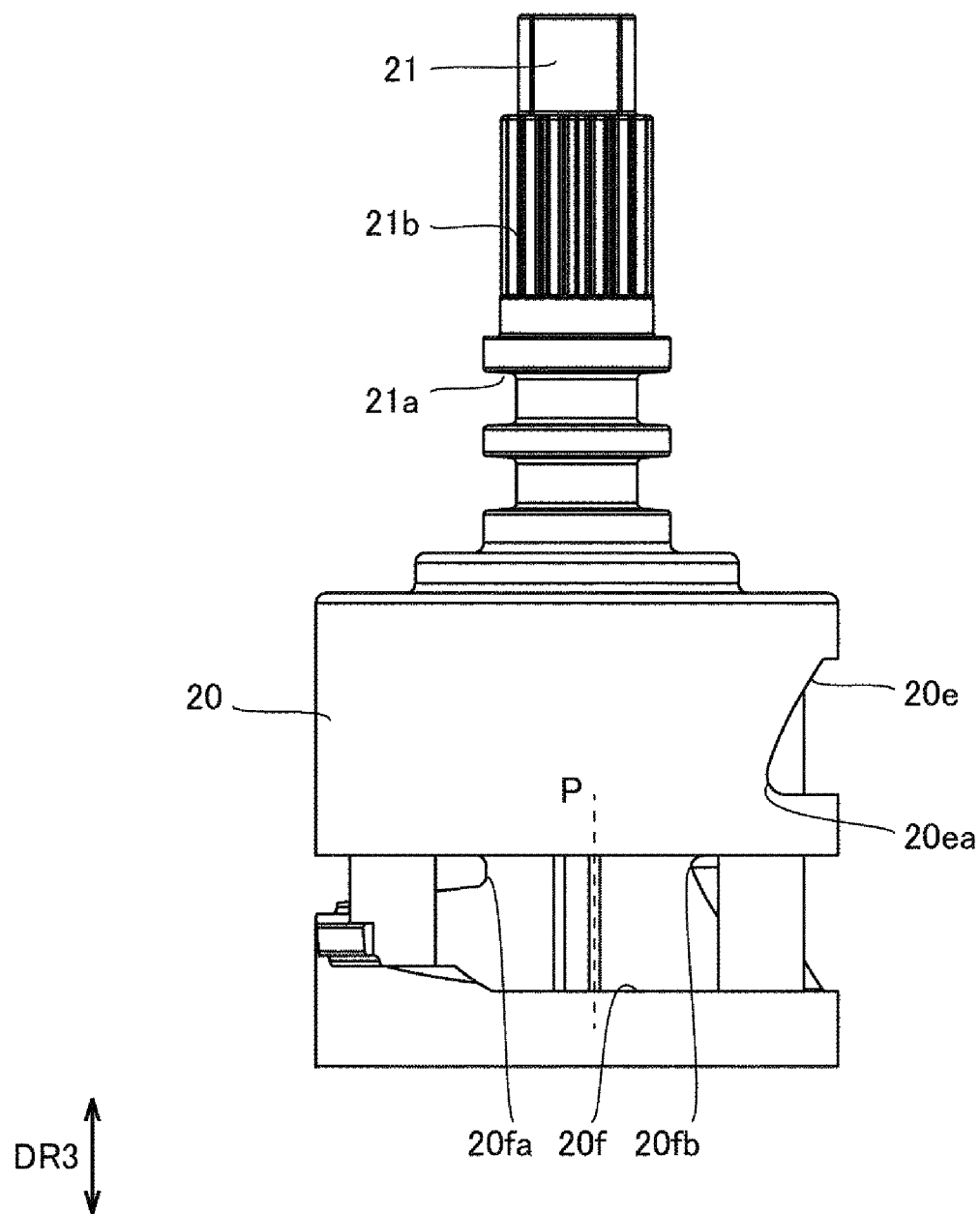
FIG. 5D is a fourth side view of the first valve body 20.
Figure 6:
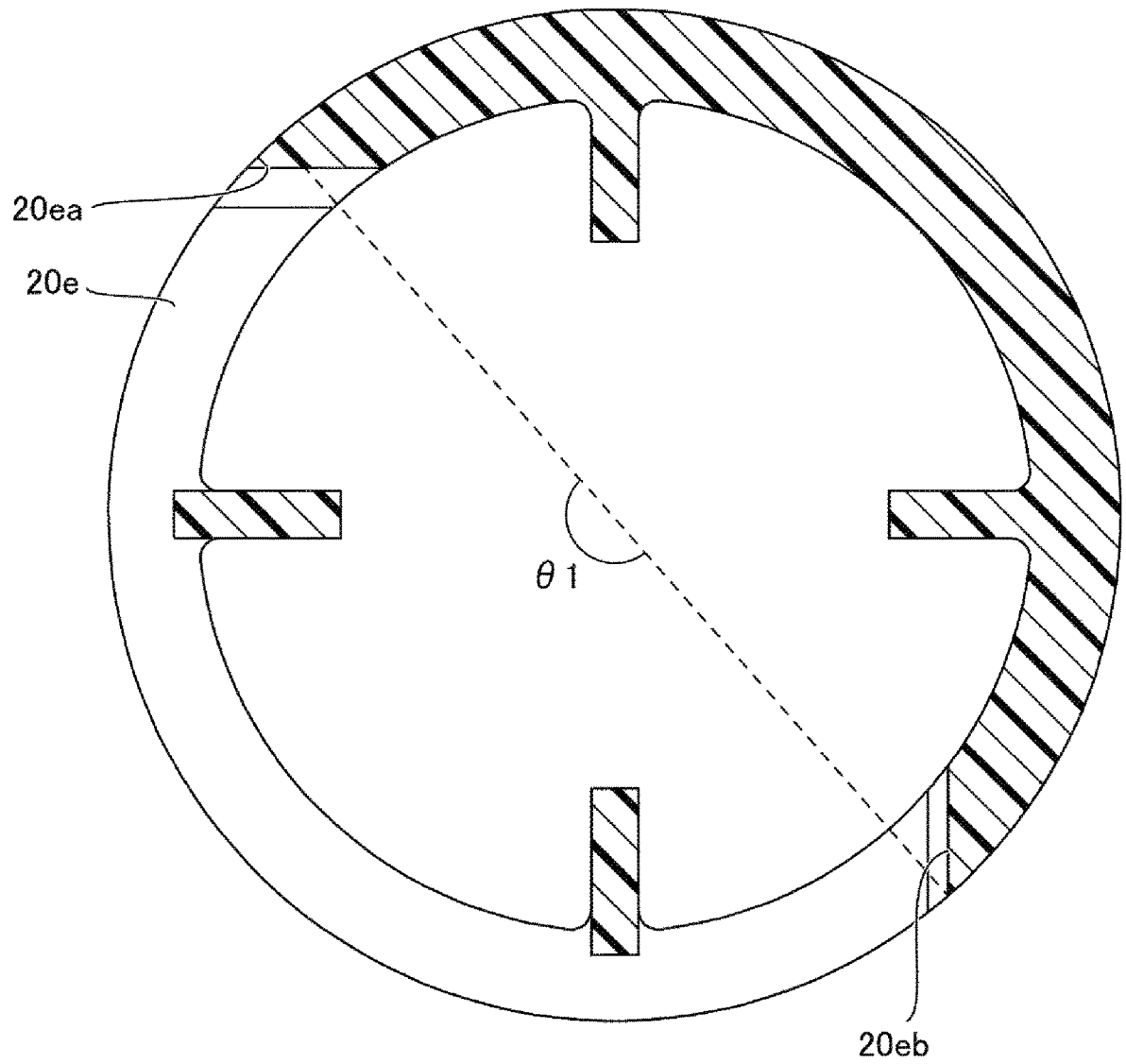
FIG. 6 is a cross-sectional view taken along VI-VI in FIG. 5B.
Figure 7:
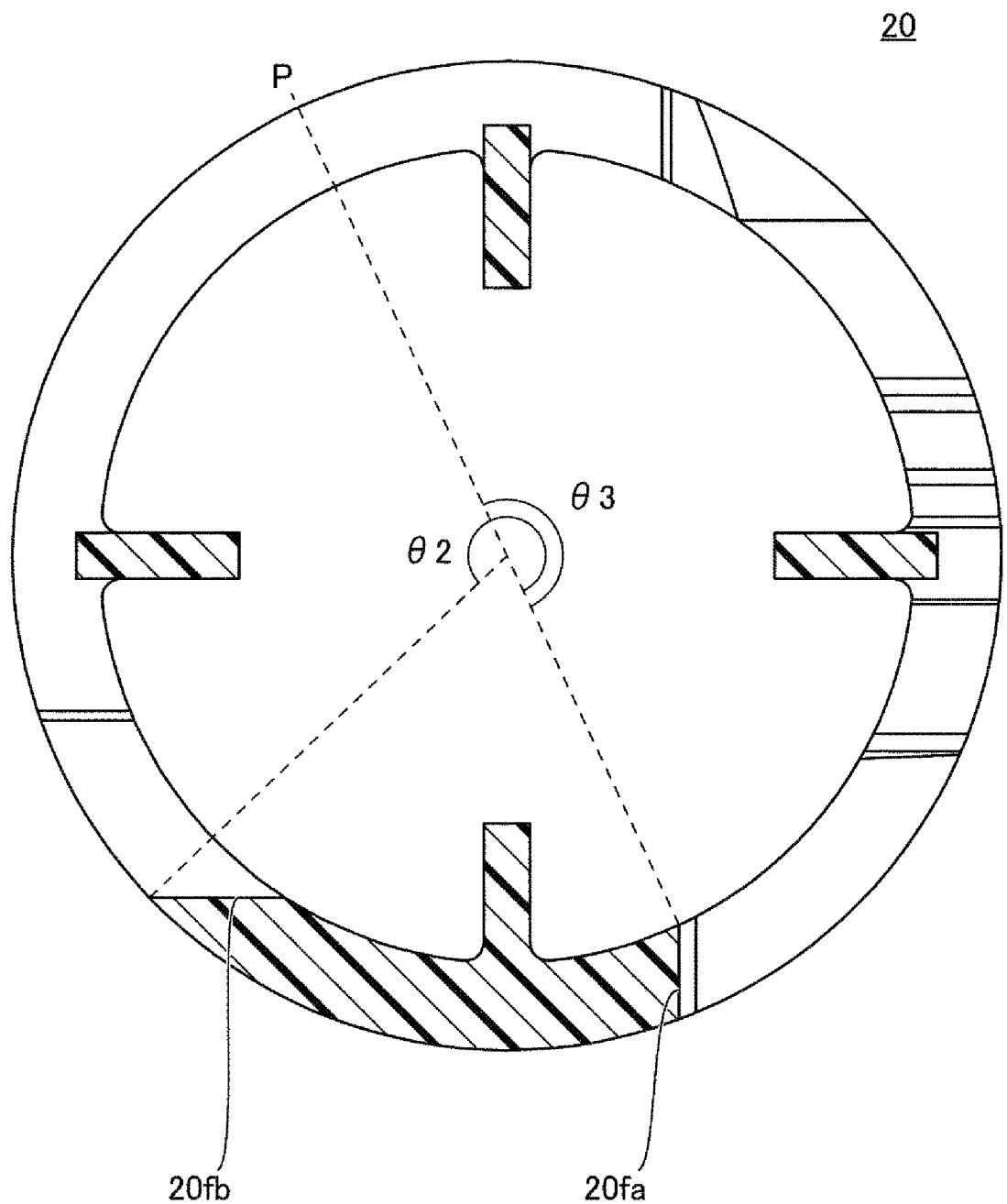
FIG. 7 is a cross-sectional view taken along VII-VII in FIG. 5B.
Figure 8:
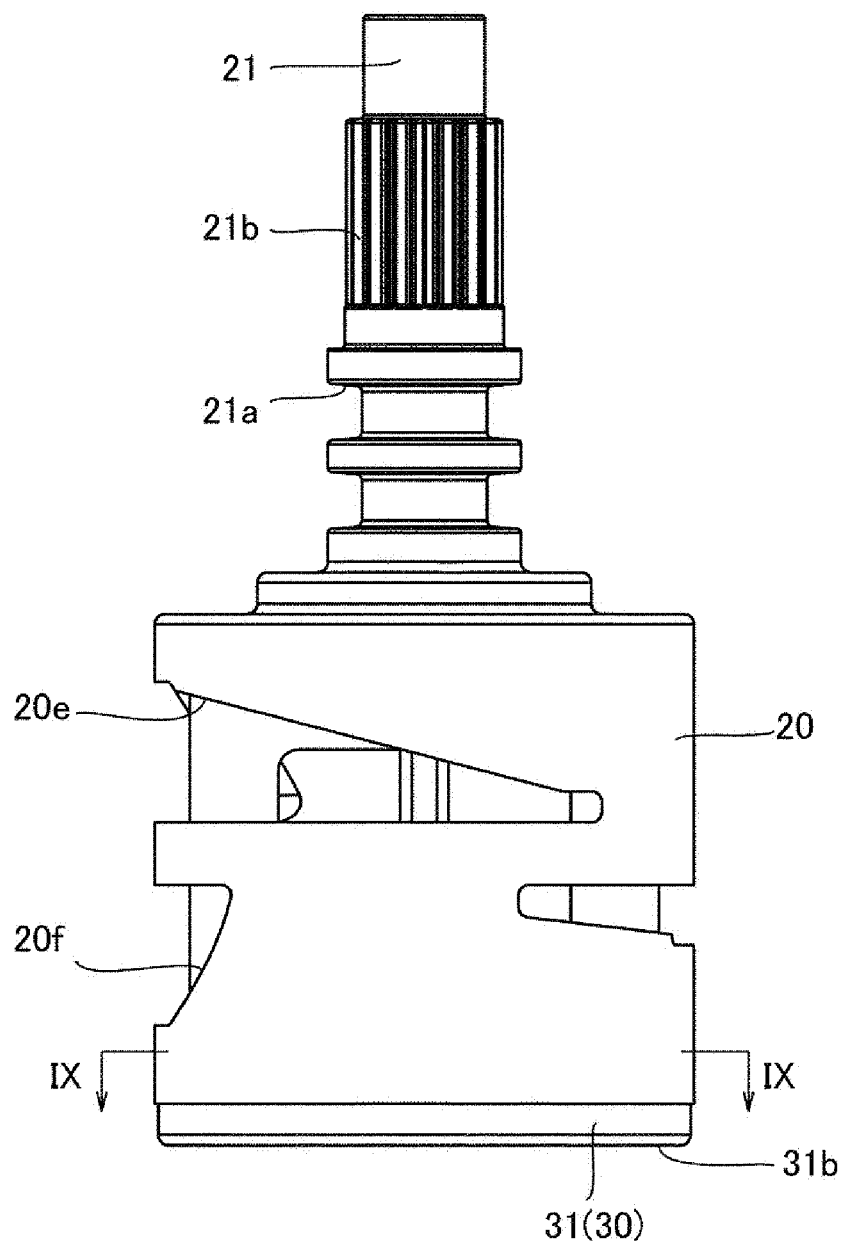
FIG. 8 is an exploded perspective view of the first valve body 20 and a second valve body 30.
Figure 9:
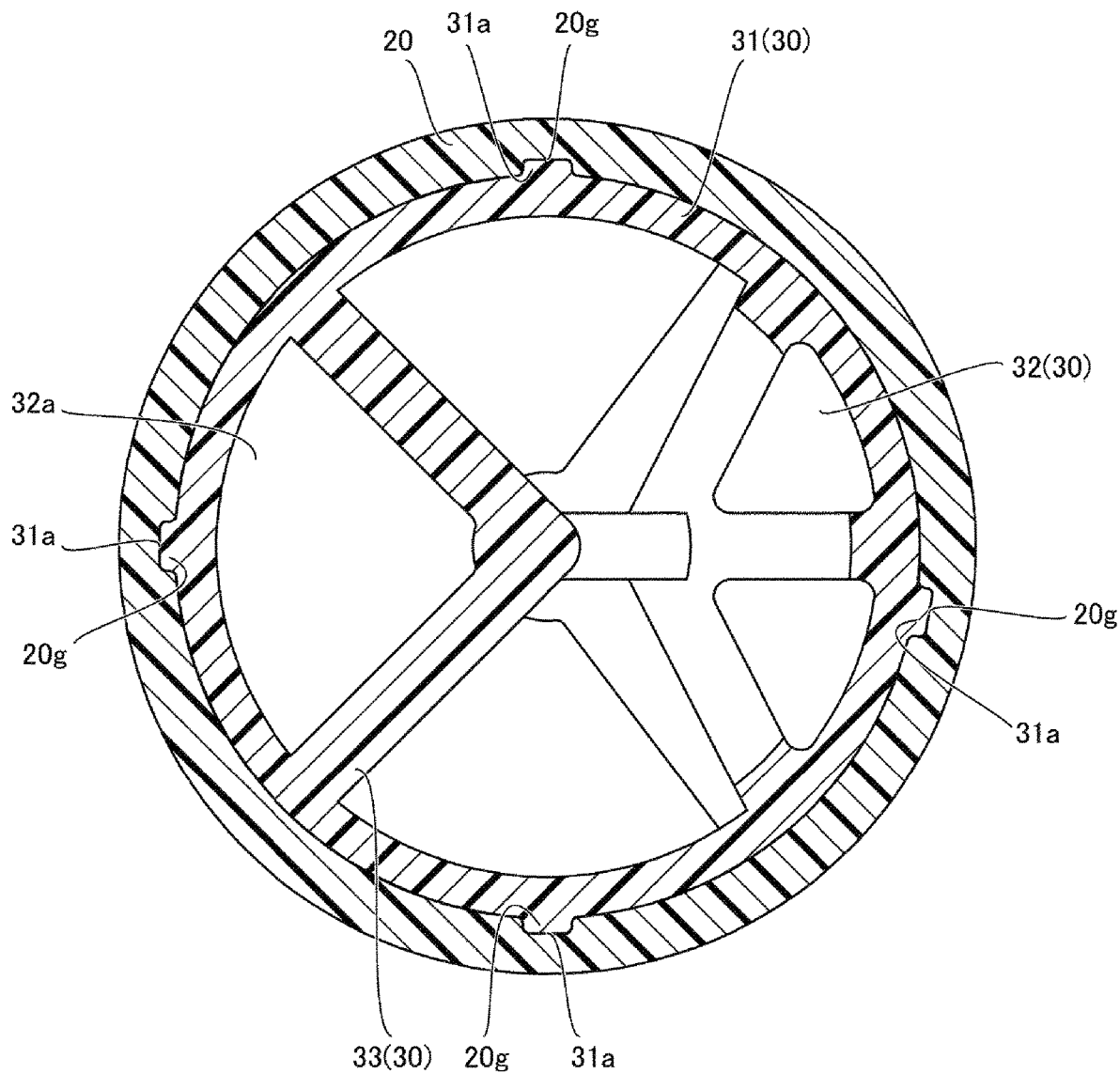
FIG. 9 is a cross-sectional view taken along IX-IX in FIG. 8.
Figure 10:
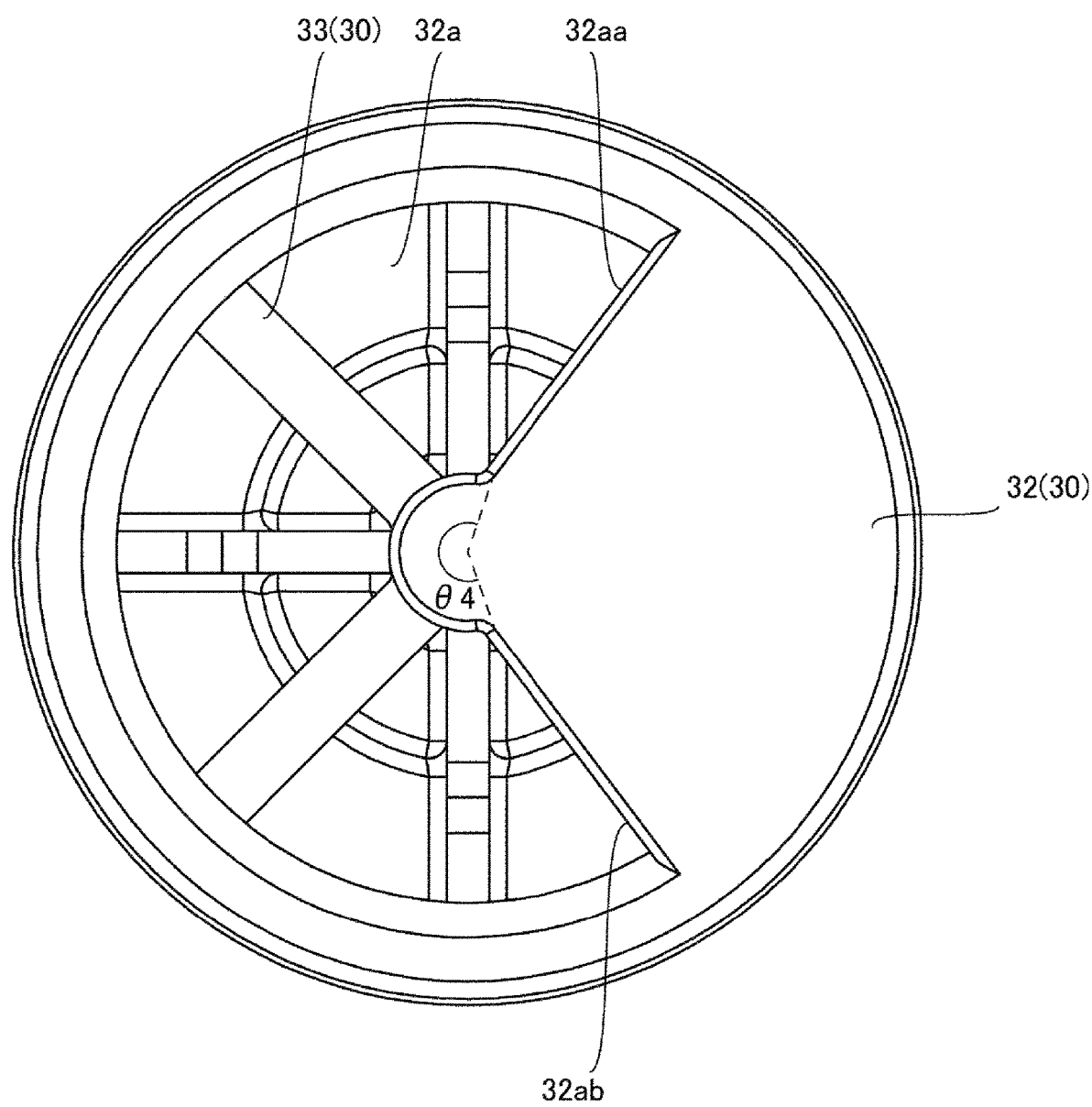
FIG. 10 is a bottom view of the first valve body 20 and the second valve body 30.

The valve device 100 is a mixing valve, for example. FIG. 1A is a first side view of the valve device 100. FIG. 1B is a second side view of the valve device 100. FIG. 2 is a cross-sectional view taken along II-II in FIG. 1A. FIG. 3 is a cross-sectional view taken along III-III in FIG. 1B. FIG. 4A is a first side view of a case 10. FIG. 4B is a second side view of the case 10. FIG. 4C is a bottom view of the case 10. FIG. 5A is a first side view of a first valve body 20. FIG. 5B is a second side view of the first valve body 20. FIG. 5B is a third side view of the first valve body 20. FIG. 5B is a fourth side view of the first valve body 20. FIG. 6 is a cross-sectional view taken along VI-VI in FIG. 5B. FIG. 7 is a cross-sectional view taken along VII-VII in FIG. 5B. FIG. 8 is a front view of the first valve body 20 and a second valve body 30. FIG. 9 is a cross-sectional view taken along IX-IX in FIG. 8. FIG. 10 is a bottom view of the first valve body 20 and the second valve body 30. As shown in FIGS. 1A to 10, the valve device 100 includes the case 10, a collar 11, an O-ring 12, the first valve body 20, the shaft body, an O-ring 22, the second valve body 30, a stepping motor 40, a thermistor 50 (not shown), and a controller 60 (not shown).

The case 10 has a valve chamber 10a, the first water communication port 10b, the second water communication port 10c, the third water communication port 10d, and an insertion hole 10e. The valve chamber 10a is an internal space of the case 10 in which the first valve body 20 and the second valve body 30 are disposed. The first water communication port 10b, the second water communication port 10c, the third water communication port 10*d*, and the insertion hole 10*e* are in communication with the valve chamber 10*a*.

The case 10 is further provided with a first flow path 10*f*, a second flow path 10*g*, a third flow path 10*h*. The extending direction of the shaft body 21 is a first direction DR1. The first flow path 10*f* extends along a second direction DR2. The second direction DR2 is a direction orthogonal to the first direction DR1. The first flow path 10*f* connects the valve chamber 10*a* and the first water communication port 10*b*. The second path 10*g* extends along a third direction DR3. The third direction DR3 is a direction orthogonal to the first direction DR1 and the second direction DR2. The second flow path 10*g* connects the valve chamber 10*a* and the second water communication port 10*c*. The third path 10*h* extends along the first direction DR1. The third flow path 10*h* connects the valve chamber 10*a* and the third water communication port 10*d*. The insertion hole 10*e* is in communication with the valve chamber 10*a* from a side opposite to the third water communication port 10*d*.

The case 10 is further provided with a first blocking part 10*i*, a second blocking part 10*j*, and a third blocking part 10*k*. The first blocking part 10*i* is disposed on the inner wall surface of the first flow path 10*f*. The first blocking part 10*i* extends along the first direction DR1 from the inner wall surface of the first flow path 10*f*. The second blocking part 10*j* is disposed on the inner wall surface of the second flow path 10*g*. The second blocking part 10*j* extends along the first direction DR1 from the inner wall surface of the second flow path 10*g*. The third blocking part 10*k* is disposed on the inner wall surface of the third flow path 10*h*. The third blocking part 10*k* is extends from the inner wall surface of the third flow path 10*h* within a surface orthogonal to the first direction DR1.

The first flow path 10*f* is partially blocked by the first blocking part 10*i*, and is connected with the valve chamber 10*a* through an opening part 10*l*. When viewed from the first water communication port 10*b*, the opening part 10*l* is in a semi-circular shape, for example. The second flow path 10*g* is partially blocked by the second blocking part 10*j*, and is connected with the valve chamber 10*a* through an opening part 10*m*. When viewed from the second water communication port 10*c*, the opening part 10*m* is in a semi-circular shape, for example. The opening part 10*m*, for example, is in a shape reversing the opening part 10*l* upside down. The third flow path 10*h* is partially blocked by the third blocking part 10*k*, and is connected with the valve chamber 10*a* through an opening part 10*n*. When viewed from the third water communication port 10*d*, the opening part 10*n* is in a fan shape, for example.

The collar 11 is inserted into the insertion hole 10*e*. The outer circumferential surface of the collar 11 is in contact with the inner wall surface of the insertion hole 10*e*. An annular groove 11*a* is formed on the inner wall surface of the collar 11. The annular groove 11*a* extends along a circumferential direction. The circumferential direction is a direction along the circumference in which the central axis of the shaft body 21 is set as the center when viewed along the first direction DR1. The O-ring 12 is disposed in the annular groove 11*a*. Accordingly, the watertightness between the outer circumferential surface of the collar 11 and the inner wall surface of the insertion hole 10*e* is secured. A through hole 11*b* is formed in the collar 11. The through hole 11*b* penetrates through the collar 11 along the first direction DR1.

The first valve body 20 is in a tubular shape extending along the first direction DR1. In the first direction DR1, the first valve body 20 has a first end 20*a* and a second end 20*b*.

The second end 20*b* is an end on the side opposite to the first end 20*a*. The first valve body 20 is blocked at the first end 20*a*. The first valve body 20 is not blocked at the second end 20*b*.

The first valve body 20 has a first portion 20*c* and a second portion 20*d*. The first portion 20*c* and the second portion 20*d* are arranged side-by-side in the first direction DR1. The first blocking part 10*i* faces the second portion 20*d*. The second blocking part 10*j* faces the first portion 20*c*. In the first valve body 20, the first opening part 20*e* and the second opening part 20*f* are formed. More specifically, the first opening part 20*e* is formed in the first portion 20*c*, and the second opening part 20*f* is formed in the second portion 20*d*. The first opening part 20*e* and the second opening part 20*f* penetrate through the first valve body 20 to be in communication with the internal space of the first valve body 20.

The first opening part 20*e* extends along the circumferential direction. In the circumferential direction, the first opening part 20*e* has a first end 20*ea* and a second end 20*eb*. The second end 20*eb* is an end on the side opposite to the first end 20*ea*. The width of the first opening part 20*e* in the first direction DR1 is set as a width W1. The width D1 decreases toward the second end 20*eb*. The angle formed by a hypothetical line passing through the first end 20*ea* and the central axis of the shaft body 21 and a hypothetical line passing through the second end 20*eb* and the central axis of the shaft body 21 when viewed in the first direction DR1 is set as a first angle θ1.

The second opening part 20*f* extends along the circumferential direction. In the circumferential direction, the second opening part 20*f* has a first end 20*fa* and a second end 20*fb*. The second end 20*fb* is an end on the side opposite to the first end 20*fa*. A position between the first end 20*fa* and the second end 20*fb* in the circumferential direction is set as an intermediate position P. The width of the second opening part 20*f* in the first direction DR1 is set as a width W2. The width W2 increases toward the intermediate position P, and reaches the maximum at the intermediate position P. The width W2 is constant between the intermediate position P and the second end 20*fb*, and is maintained at the maximum.

The angle formed by a hypothetical line passing through the first end 20*fa* and the central axis of the shaft body 21 and a hypothetical line passing through the second end 20*fb* and the central axis of the shaft body 21 when viewed in the first direction DR1 is set as a second angle θ2. The second angle θ2 is greater than the first angle θ1. The angle formed by a hypothetical line passing through the first end 20*fa* and the central axis of the shaft body 21 and a hypothetical line passing through the intermediate position P and the central axis of the shaft body 21 when viewed in the first direction DR1 is set as a third angle θ3. The third angle θ3 is equal to the first angle θ1.

The shaft body 21 extends along the first direction DR1. The shaft body 21 is connected with the first end 20*a*. The shaft body 21 is inserted into the through hole 11*b*. The outer circumferential surface of the shaft body 21 is in contact with the inner wall surface of the through hole 11*b*. An annular groove 21*a* is formed on the outer circumferential surface of the shaft body 21. The annular groove 21*a* extends along the circumferential direction. The annular groove 21*a* is a portion at the outer circumferential surface of the shaft body 21 facing the inner wall surface of the through hole 11*b*. An O-ring 22 is disposed in the annular groove 21*a*. Accordingly, the watertightness between the inner wall surface of the through hole 11*b* and the outer circumferential surface of the shaft body 21 is secured.

The shaft body 21 has involute serrations 21b. The involute serrations 21b are provided on the tip end side of the shaft body 21 with respect to the portion of the shaft body 21 located in the through hole 11b. The involute serrations 21b are at a position protruding from the case 10.

The second valve body 30 has a tubular part 31, a bottom part 32, and a rib 33. The tubular part 31 is in a tubular shape extending along the first direction DR1. The second valve body 30 is engaged with the second end 20b in the cylindrical part 31 to be not rotatable about the central axis of the shaft body 21. Multiple convex parts 20g are formed on the inner circumferential surface of the first valve body 20 located at the second end 20b. Multiple concave parts 31a are formed on the outer circumferential surface of the tubular part 31. By engaging the respective convex parts 20g with the respective concave parts 31a, the tubular part 31 is engaged with the second end 20b to be not rotatable about the central axis of the shaft body 21. The outer circumferential surface of the tubular part 31 is in contact with the inner circumferential surface of the first valve body 20 located at the second end 20b.

It may be that the concave parts 31a are disposed to exhibit rotational symmetry of one time about the central axis of the shaft body 21 when viewed along the first direction DR1. It may also be that the convex parts 20g are disposed to exhibit rotational symmetry of one time about the central axis of the shaft body 21 when viewed along the first direction DR1. In other words, the concave parts 31a may be disposed so as not to overlap the position before rotation unless the concave parts 31a rotate 360° about the central axis of the shaft body 21 when viewed in the first direction DR1, and the convex parts 20g may be disposed so as not to overlap the position before rotation unless the convex parts 20g rotate 360° about the central axis of the shaft body 21 when viewed in the first direction DR1. Accordingly, the second valve body 30 is prevented from being installed to the first valve body 20 at an erroneous angle is prevented.

In the first direction DR1, the tubular part 31 has a first end 31b and a second end 31c. The second end 31c is an end on the side opposite to the first end 31b. The bottom part 32 is linked with the second end 31c. The third opening part 32a is formed in the bottom part 32. The third opening part 32a penetrates through the bottom part 32 to be in communication with the internal space of the first valve body 20. In the circumferential direction, the third opening part 32a has a first end 32aa and a second end 32ab. The second end 32ab is an end on the side opposite to the first end 32aa. The angle formed by a hypothetical line passing through the first end 32aa and the central axis of the shaft body 21 and a hypothetical line passing through the second end 32ab and the central axis of the shaft body 21 when viewed in the first direction DR1 is set as a fourth angle θ4. The value obtained by subtracting the fourth angle θ4 from 360° is equal to or greater than the value obtained by subtracting the first angle θ1 from the second angle θ2.

The rib 33 extends to intersect with the third opening part 32a when viewed in the first direction DR1. An end of the rib 33 is connected with the inner wall surface of the tubular part 31, and the other end is connected with the bottom part 32. Accordingly, the bottom part 32 is supported by the rib 33.

The stepping motor 40 is installed to the case 10 by using a motor installation plate 41. The involute serrations 21b are fit with a rotation output part of the stepping motor 40. Accordingly, the stepping motor 40 rotates the shaft body 21 about the central axis of the shaft body 21 and rotates the first valve body 20 about the central axis of the shaft body 21. Since the second valve body 30 is installed to the first valve body 20 to be not rotatable about the central axis of the shaft part 21, together with the rotation about the central axis of the shaft body 21, the second valve body 30 is also rotated about the central axis of the shaft body 21.

In the case where the rotational position of the first valve body 20 about the central axis of the shaft body 21 is in a first angle region, the first opening part 20e faces the opening part 10*l*. When the first valve body 20 is rotated about the central axis of the shaft body 21 to approach a second angle region, a portion of the first opening part 20e closer to the second end 20eb faces the opening part 10*l*. Since the width W1 decreases toward the second end 20eb, when the first valve body 20 is rotated about the central axis of the shaft body 21 in the first angle region to approach the second angle region, the opening area of the first opening part 20e when viewed from the first water communication port 10b decreases.

In the case where the rotational position of the first valve body 20 about the central axis of the shaft body 21 is in the second angle region, the first opening part 20e does not face the opening part 10*l*. That is, in the case where the rotational position of the first valve body 20 about the central axis of the shaft body 21 is in the second angle region, the opening area of the first opening part 20e when viewed from the first water communication port 10b is maintained at the minimum.

In the case where the rotational position of the first valve body 20 about the central axis of the shaft body 21 is in the first angle region, the second opening part 20f faces the opening part 10m. When the first valve body 20 is rotated about the central axis of the shaft body 21 to approach the second angle region, among portions of the second opening part 20f between the first end 20fa and the intermediate position P, a portion closer to the second end 20fb faces the opening part 10m. Since the width W2 increases toward the intermediate position P, when the first valve body 20 is rotated about the central axis of the shaft body 21 in the first angle region to approach the second angle region, the opening area of the second opening part 20f when viewed from the second water communication port 10c increases until the maximum.

In the case where the rotational position of the first valve body 20 about the central axis of the shaft body 21 is in the second angle region, only the portion of the second opening part 20f between the intermediate position and the second end 20fb faces the opening part 10m. Since the width W2 is maintained at the maximum between the intermediate position P and the second end 20fb, in the case where the rotational position of the first valve body 20 about the central axis of the shaft body 21 is in the second angle region, the opening area of the second opening part 20f when viewed from the second water communication port 10c is maintained at the maximum.

In the case where the rotational position of the first valve body 20 about the central axis of the shaft body 21 is in the first angle region, the opening area of the third opening part 32a when viewed from the third water communication port 10d is maintained at the maximum. That is, in the case where the rotational position of the first valve body 20 about the central axis of the shaft body 21 is in the first angle region, the third opening part 32a only overlaps with the opening part 10n. When the first valve body 20 is rotated about the central axis of the shaft body 21 to move away from the first angle region, the opening area of the third opening part 32a of the third water communication port 10d decreases. That is, when the first valve body 20 is rotated about the central axis of the shaft body 21 to move away from the first angle region, the overlapping between the bottom part 32 and the opening part 10n increases.

The angular width of the first angle region is equal to the first angle θ1. The angular width of the first angle region is 180°, for example. The angular width of the second angle region is equal to the difference between the second angle θ2 and the first angle θ1. The angular width of the second angle region is 90°, for example. However, the angular width of the first angle region and the angular width of the second angle region are not limited thereto.

The flow rate of water flowing from the first water communication port 10b to the third water communication port 10d is set as a first flow rate, and the flow rate of water flowing from the second water communication port 10c to the third water communication port 10d is set as a second flow rate. The value obtained by dividing the first flow rate by the sum of the first flow rate and the second flow rate is set as a mixing ratio. The mixing ratio may decrease linearly by rotating the first valve body 20 about the central axis of the shaft body 21 in the first angle region to approach the second angle region. If the slope of the decrease of the mixing ratio does not change significantly as the rotational angle of the first valve body 20 increases, the mixing ratio is assumed to decrease linearly.

The case 10 is further formed with a through hole 10p (not shown). The through hole 10p penetrates through the case 10 to be in communication with the third flow path 10h. The thermistor 50 is inserted into the through hole 10p. The thermistor 50 is connected with the controller 60. The thermistor 50 detects the temperature of the water (hot water) flowing through the third flow path 10h to output a signal indicating such temperature to the controller 60. The controller 60 adjusts the temperature of the water (hot water) flowing through the third flow path 10h by controlling the stepping motor 40 to change the rotational position of the first valve body 20 about the central axis of the shaft body 21 based on the signal output from the thermistor 50.

Although an example in which the second flow path 10g extends along the second direction DR2 is described above, the second flow path 10g may also extend along a direction other than the second direction DR2. For example, the second flow path 10g may also extend along the first direction DR1. In this case, the second flow path 10g is connected with the valve chamber 10a from a side opposite to the first flow path 10f.

Although an example in which the first valve body 20 and the second valve body 30 are different components is described above, the first valve body 20 and the second valve body 30 may also be formed integrally.

(Effect of the Valve Device 100)

In the following, the effect of the valve device 100 is described.

Figure 11:
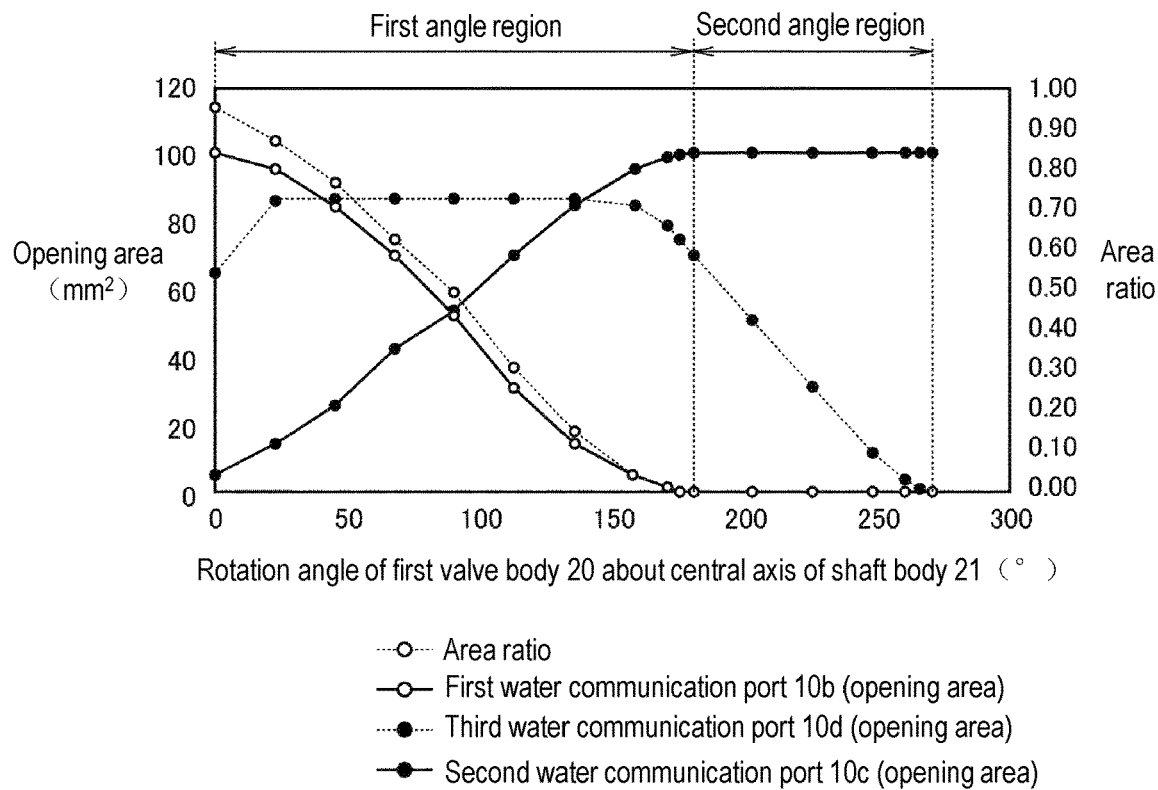
FIG. 11 is a graph illustrating a relationship among a rotational position of the first valve body 20 about the central axis of a shaft body 21, an opening area of a first opening part 20e when viewed from a first water communication port 10b, an opening area of a second opening part 20f when viewed from a second water communication port 10c and an opening area of a third opening part 32a when viewed from a third water communication port 10d.

FIG. 11 is a graph illustrating a relationship among a rotational position of the first valve body 20 about the central axis of the shaft body 21, an opening area of the first opening part 20e when viewed from the first water communication port 10b, the opening area of the second opening part 20f when viewed from the second water communication port 10c and the opening area of the third opening part 32a when viewed from the third water communication port 10d. As shown in FIG. 11, when the first valve body 20 is rotated about the central axis of the shaft body 21 in the first angle region to approach the second angle region, the opening area of the first opening part 20e when viewed from the first water communication port 10b decreases. When the first valve body 20 is rotated about the central axis of the shaft body 21 in the first angle region to approach the second angle region, the opening area of the second opening part 20f when viewed from the second water communication port 10c increases.

Figure 12:
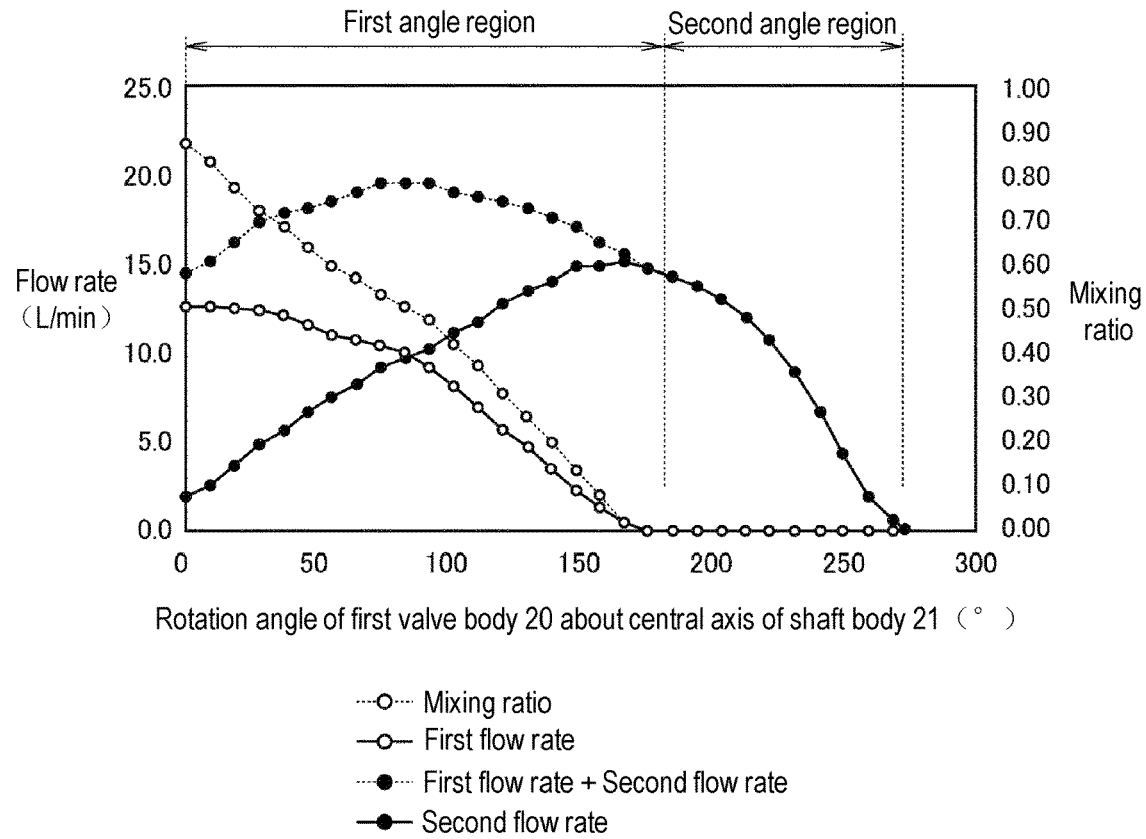
FIG. 12 is a graph illustrating a relationship among the rotational position of the first valve body 20 about the central axis of the shaft body 21, a first flow rate, and a second flow rate.

FIG. 12 is a graph illustrating a relationship among the rotational position of the first valve body 20 about the central axis of the shaft body 21, the first flow rate, and the second flow rate. The result of changing the opening area of the first opening part 20e when viewed from the first water communication port 10b and the opening area of the second opening 20f when viewed from the second water communication port 10c described above indicates that, as shown in FIG. 12, when the first valve body 20 is rotated about the central axis of the shaft body 21 in the first angle region to approach the second angle region, the first flow rate decreases, and the second flow rate increases. In this way, in the valve device 100, since the mixing ratio can be adjusted by rotating the first valve body about the central axis of the shaft body 21 in the first angle region, the temperature of the hot water that is supplied can be adjusted.

At the time when the rotational position of the first valve body 20 about the central axis of the shaft body 21 is in the second angle region, the opening area of the first opening part 20e when viewed from the first water communication port 10b is maintained at the minimum (maintained at 0). At the time when the rotational position of the first valve body 20 about the central axis of the shaft body 21 is in the second angle region, the opening area of the second opening part 20f when viewed from the second water communication port 10c is maintained at the maximum. When the first valve body 20 is rotated about the central axis of the shaft body 21 in the first angle region to move away from the first angle region, the opening area of the third opening part 32a when viewed from the third water communication port 10d decreases. In this way, in the valve device 100, at the time when the first valve body 20 is rotated about the central axis of the shaft body 21 in the second angle region, the second flow rate is adjusted by using the second valve body 30. If only the first valve body 20 is configured to adjust the second flow rate when the first valve body 20 is rotated in the second angle region, the second flow rate may change significantly at each rotational angle of the first valve body 20 about the central axis of the shaft body 21. This phenomenon is even more significant in the use under a hot water pressure condition. In the valve device 100, since the second valve body 30 is also used to adjust the second flow rate when the first valve body is rotated in the second angle region, the change of the second flow rate at each rotational angle of the first valve body 20 about the central axis of the shaft body 21 can be decreased, and the temperature of the hot water that is supplied is adjusted easily.

In the case where the mixing ratio decreases linearly by rotating the first valve body 20 about the central axis of the shaft body 21 in the first angle region to approach the second angle region, the temperature of the water (hot water) flowing through the third flow path 10h changes linearly with respect to the angle of the rotation of the first valve body 20 about the central axis of the shaft body 21, so the temperature of the hot water that is supplied is adjusted easily by using the controller 60.

(Configuration of the Hot Water Supply Device 200)

In the following, the configuration of the hot water supply device 200 is described.

Figure 13:
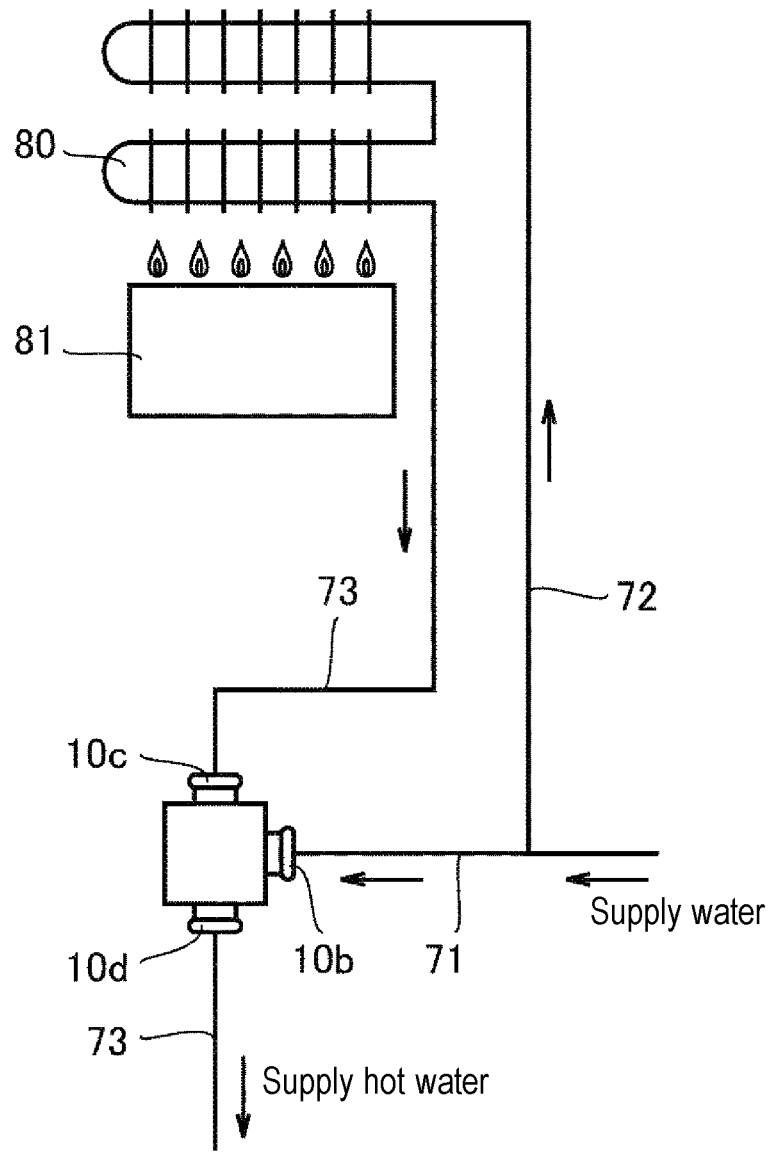
FIG. 13 is a schematic view of a hot water supply device 200.

FIG. 13 is a schematic view of the hot water supply device 200. As shown in FIG. 13, the hot water supply device 200 has the valve device 100, a pipe 71, a pipe 72, a pipe 73, a pipe 74, a heat exchanger 80, and a burner 81. An end of the pipe 71 is connected with the tap water pipe, and the other end of the pipe 71 is connected with the first water communication port 10b. An end of the pipe 72 is connected with the pipe 71, and the other end of the pipe 72 is connected with the heat exchanger 80. An end of the pipe 73 is connected with the heat exchanger 80, and the other end of the pipe 73 is connected with the second water communication port 10c. An end of the pipe 74 is connected with the third water communication port 10d.

Water is supplied to the first water communication port 10b via the pipe 71. Water is supplied to the heat exchanger 80 via the pipe 71 and the pipe 72. The water supplied to the heat exchanger 80 is heated by performing heat exchange with the combustion gas generated in the burner 81. Water (hot water) passing through the heat exchanger 80 to be heated is supplied to the second water communication port 10c via the pipe 73. In the valve device 100, the mixing ratio is changed by adjusting the rotational position of the first valve body 20 about the central axis of the shaft body 21 in the first angle region, and the temperature of the water (hot water) flowing from the third communication port 10d toward the pipe 74 is adjusted.

Due to the upper limit of the heating capability in the heat exchanger 80, the temperature of the water (hot water) flowing from the third water communication port 10d to the pipe 74 may not be increased to the desired temperature even if the mixing ratio is set to the maximum. In such case, by adjusting the rotational position of the first valve body 20 about the central axis of the shaft body 21 in the second angle region, the temperature of the water (hot water) flowing from the third communication port 10d toward the pipe 74 is adjusted.

In the above, an example in which the valve device 100 is used as a mixing valve for mixing low-temperature water and high-temperature water is shown. However, the application of the valve device 100 is not limited thereto. For example, it may also be that a by-pass pipe is connected with the first water communication port 10b, a pipe connected with the heat exchanger is connected with the second water communication port 10c, and a pipe connected with the tap water pipe is connected with the third water communication port 10d. In such case, the valve device 100 may serve as a distribution valve and a flow rate adjustment valve on the water inlet side.

Although the embodiment of the invention has been described as above, it is also possible to modify the above embodiment in various ways. Further, the scope of the present invention is not limited to the above embodiments. The scope of the present invention is indicated by the claims, and is intended to include all changes within the meaning and scope equivalent to the claims.

What is claimed is:

1. A valve device, comprising:
   a case;
   a first valve body and a second valve body; and
   a shaft body connected with the first valve body,
   wherein the case has a valve chamber and a first water communication port, a second water communication port, and a third water communication port in communication with the valve chamber,
   the first valve body and the second valve body are disposed in the valve chamber,
   the first valve body is rotated about a central axis of the shaft body,
   the second valve body is rotated about the central axis together with the first valve body,
   when the first valve body is rotated about the central axis in a first angle region, a first flow rate and a second flow rate are changed by the first valve body, wherein the first flow rate is a flow rate of water flowing between the first water communication port and the third water communication port, and the second flow rate is a flow rate of water flowing between the second water communication port and the third water communication port,
   when the first valve body is rotated about the central axis in a second angle region, the second flow rate is changed by the second valve body.

2. The valve device as claimed in claim 1, wherein the first flow rate decreases as the first valve body approaches the second angle region when the first valve body is rotated about the central axis in the first angle region, and the first flow rate is maintained at a minimum when the first valve body is rotated in the second angle region, and
   the second flow rate increases as the first valve body approaches the second angle region when the first valve body is rotated about the central axis in the first angle region, and the second flow rate decreases as the first valve body moves away from the first angle region when the first valve body is rotated about the central axis in the second angle region.

3. The valve device as claimed in claim 2, wherein a ratio of the first flow rate with respect to a sum of the first flow rate and the second flow rate decreases linearly as the first valve body approaches the second angle region when the first valve body is rotated about the central axis in the first angle region.

4. The valve device as claimed in claim 1, wherein the first valve body is in a tubular shape extending along a direction of the central axis,
   in the direction of the central axis, the first valve body has a first end and a second end on a side opposite to the first end,
   an internal space of the first valve body is blocked at the first end and is partially blocked at the second end by the second valve body,
   in the first valve body, a first opening part and a second opening part in communication with the internal space of the first valve body are formed,
   in the second valve body, a third opening part in communication with the internal space of the first valve body is formed,
   a first opening area, as an opening area of the first opening part when viewed from the first water communication port, decreases as the first valve body approaches the second angle region when the first valve body is rotated about the central axis in the first angle region, and is maintained at a minimum when the first valve body is rotated about the central axis in the first angle region, and
   a second opening area, as an opening area of the second opening part when viewed from the second water communication port, increases as the first valve body approaches the second angle region when the first valve body is rotated about the central axis in the first angle region, and is maintained at a maximum when the first valve body is rotated about the central axis in the second angle region, and
   a third opening area, as an opening area of the third opening part when viewed from the third water communication port, is maintained at a maximum vale when the first valve body is rotated about the central axis in the first angle region, and decreases as the first valve body moves away from the first angle region when the first valve body is rotated about the central axis in the second angle region.

5. The valve device as claimed in claim 4, wherein the second valve body is engaged with the second end to be not rotatable about the central axis.

6. A hot water supply device, comprising:
a first pipe, a second pipe, and a third pipe;
a heat exchanger; and
the valve device as claimed in claim 1,
wherein the first water communication port is connected with a tap water pipe by using the first pipe,
the second water communication port is connected with the heat exchanger by using the second pipe,
the third water communication port is connected with the third pipe, and
hot water is supplied via the third pipe.

* * * * *